United States Patent [19]

Crook

[11] 4,143,992
[45] Mar. 13, 1979

[54] WIND OPERATED POWER GENERATOR

[76] Inventor: Charles W. Crook, Rte. 1, Box 35, Earle, Ark. 72331

[21] Appl. No.: 855,912

[22] Filed: Nov. 29, 1977

[51] Int. Cl.² .............................................. F03D 7/00
[52] U.S. Cl. ...................................... 415/2; 290/55; 416/DIG. 4
[58] Field of Search ....................... 415/2-4, 415/208; 290/44, 55; 416/DIG. 4

[56] References Cited

U.S. PATENT DOCUMENTS

| | | | |
|---|---|---|---|
| 833,184 | 10/1906 | Terzian | 416/DIG. 4 |
| 1,075,994 | 10/1913 | Serramoglia et al. | 415/2 |
| 1,313,457 | 8/1919 | Bowman | 416/168 |
| 1,329,668 | 2/1920 | Lee | 416/185 |
| 1,433,995 | 10/1922 | Fousle | 415/2 |
| 1,851,513 | 3/1932 | Holmstrom | 415/2 |
| 2,517,135 | 8/1950 | Rudisill | 416/DIG. 4 |
| 2,701,526 | 2/1955 | Rotkin | 415/500 |
| 4,021,135 | 5/1977 | Pedersen | 415/209 |

Primary Examiner—C. J. Husar
Attorney, Agent, or Firm—Clarence A. O'Brien; Harvey B. Jacobson

[57] ABSTRACT

A convergent intake duct has a radial outflow opening through which air accelerated in the duct impinges on airfoil shaped vanes to induce rotation of the rotor on which the vanes are mounted. The duct is formed internally of a tubular airfoil body so that the low pressure region formed on the trailing edge portion of the external airfoil surface increases the pressure differential across the vanes in the radial direction of outflow of the air from the duct.

14 Claims, 6 Drawing Figures

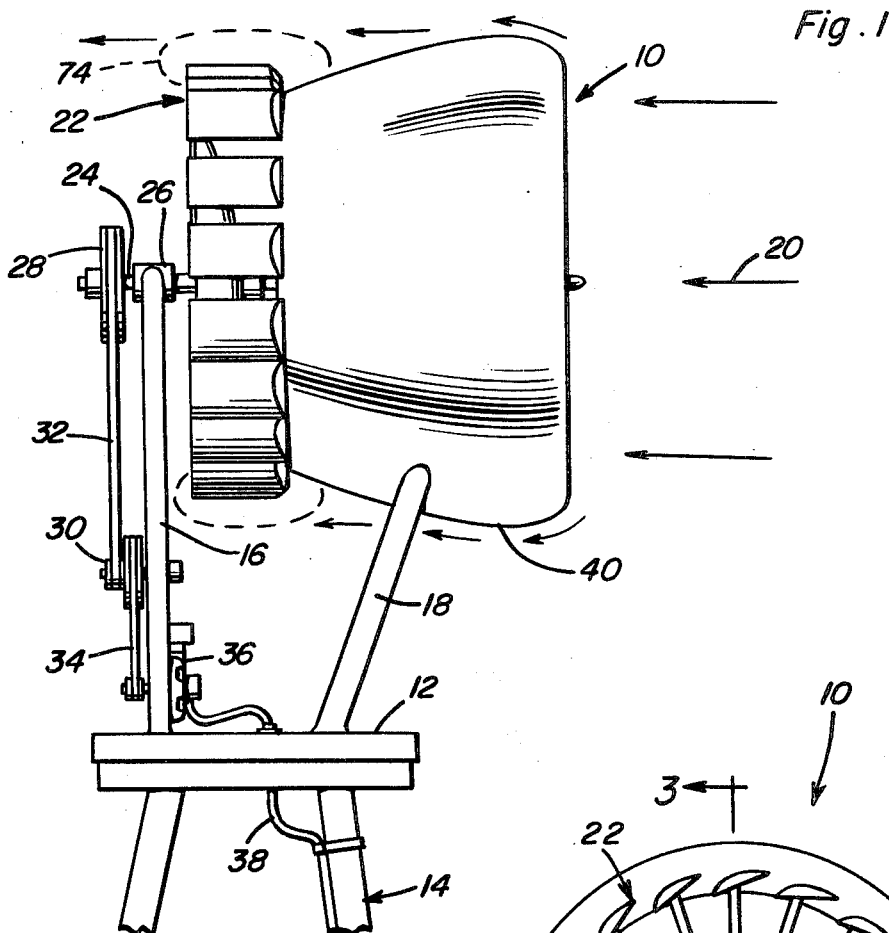
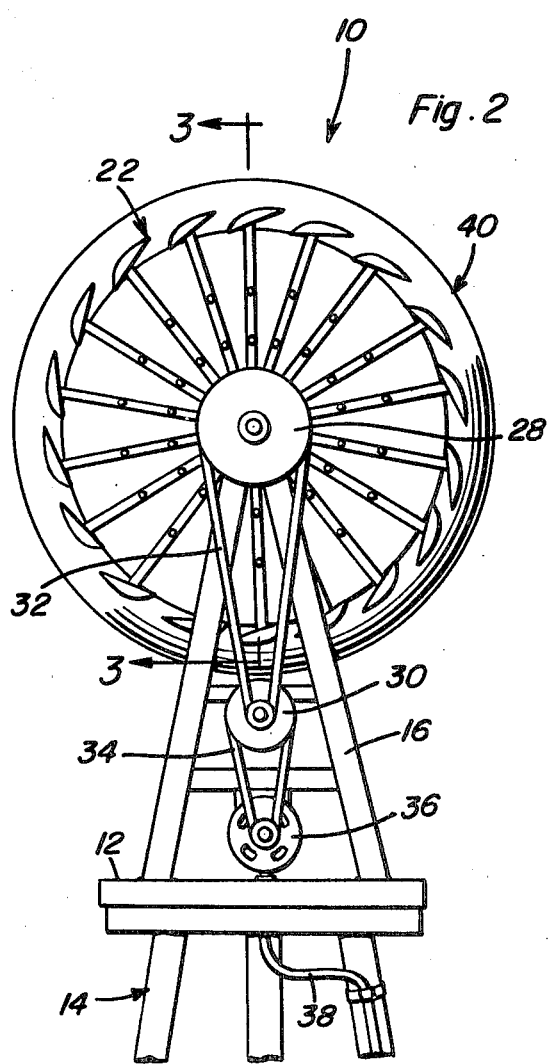
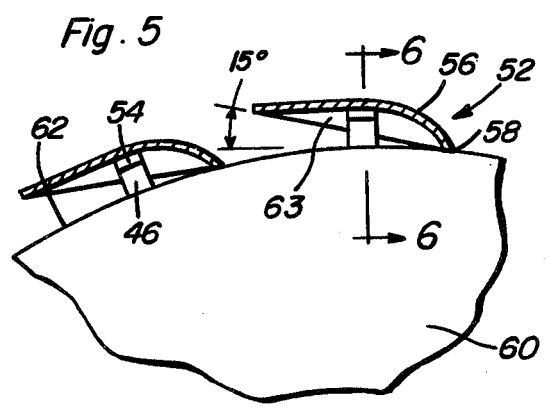
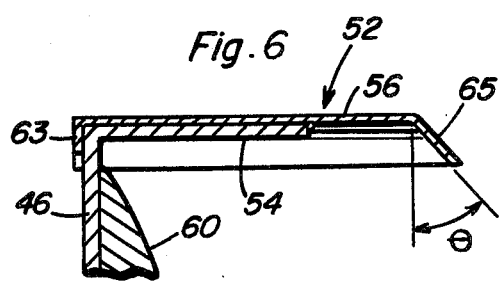

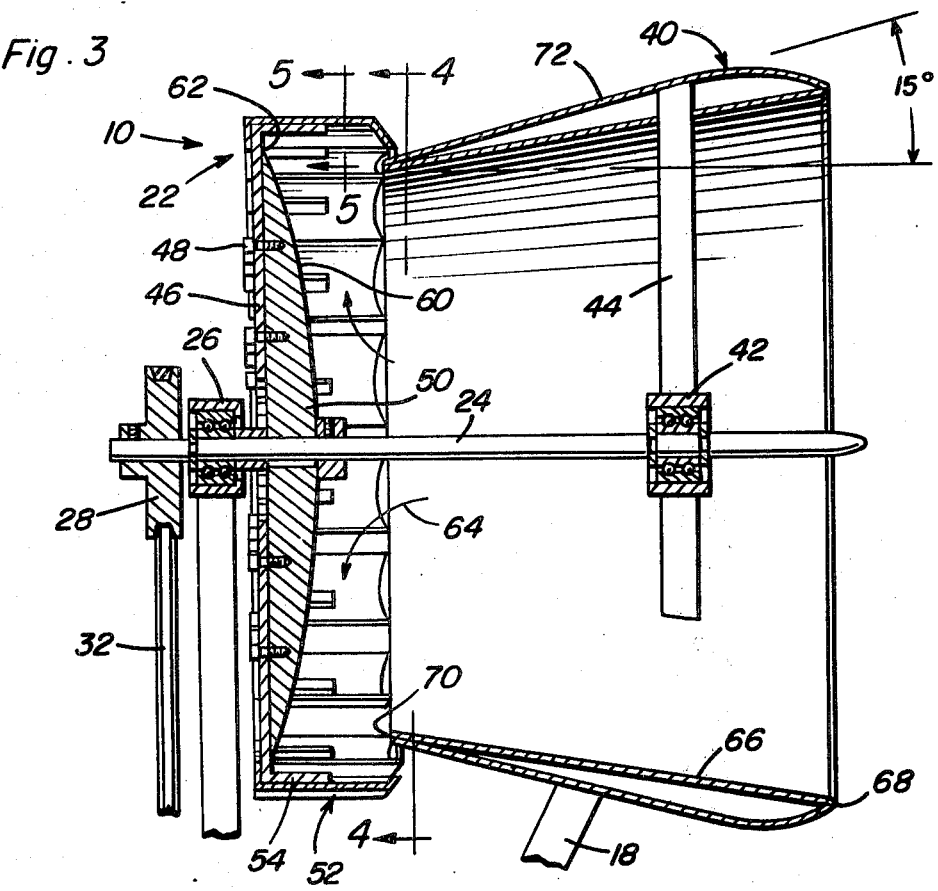
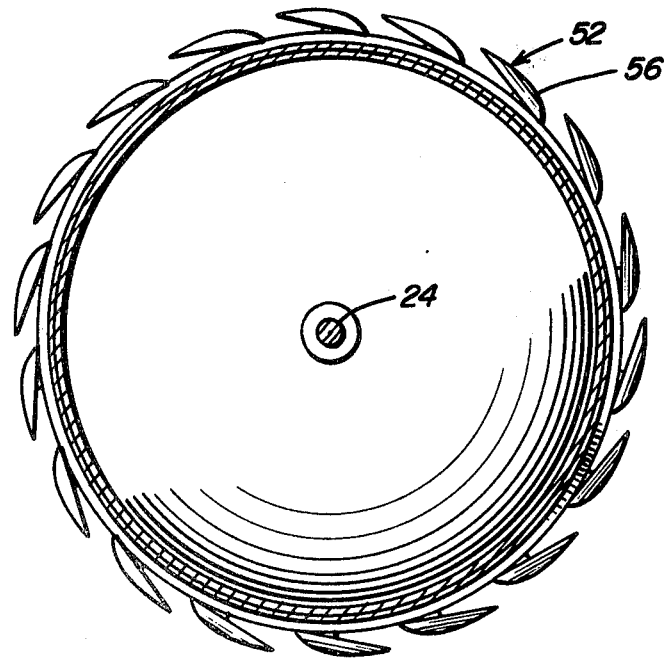

WIND OPERATED POWER GENERATOR

BACKGROUND OF THE INVENTION

This invention relates to wind and other fluid driven turbine assemblies for powering electric generators or the like.

The kinetic energy of air manifested by winds, as a cheap and inexhaustible source of power, has been the subject of renewed interest because of the depletion of fossil fuels. While the harnessing of wind energy by windmills or wind turbines is an old and highly developed art, relatively recent technological advances in related arts have brought about further attempts to improve the operational efficiency of windmill turbines. Thus, the adaptation of aerodynamic principles are proposed for wind driven turbines of the type having a ducted intake flow of air directed against rotor mounted blades or vanes. While the use of ducts to direct airflow is advantageous in reducing losses due to turbulence, this is offset by increased frictional losses as well as structural problems with respect to blade and duct design.

It is therefore an important object of the present invention to provide a wind driven turbine of the ducted type having a net increase in operational efficiency as compared to non-ducted types of wind turbines. An additional object is to provide a ducted type of wind driven turbine capable of being constructed and assembled in an economical fashion.

PRIOR ART STATEMENT

Ducted fluid turbines or fans are disclosed in prior U.S. patents of rather old vintage including U.S. Pat. Nos. 556,453, 1,313,457 and 1,329,668. According to these patents, fluid flow may be accelerated by inflow through a convergent duct and directed radially outward by a deflecting surface for impingement against blades or vanes mounted on a rotor. Such a basic arrangement for a wind turbine is also disclosed in U.S. Pat. No. 2,701,526 to Rotkin. According to a more recent U.S. Pat. No. 4,021,135 to Pedersen et al., a convergent-divergent duct encloses an internal airfoil body to affect the flow of air internally of the duct for drive of reaction type blades on the rotor and through vanes fixed to the duct generate a vortex within the duct to increase the pressure differential across the turbine blades. The foregoing patents are the only prior art deemed to be relevant and capable of being specifically identified at the present time by applicant and those substantively involved in the preparation of this application.

SUMMARY OF THE INVENTION

In accordance with the present invention a ducted wind turbine is provided of a type such as shown in the Rotkin patent, aforementioed, but having rotor blades or vanes that are cup shaped and have an airfoil contour in a plane perpendicular to the rotor axis so as to reduce surface friction in the direction of rotation. The pressure differential across these airfoil vanes in the direction of the radial outflow of air impinging on the vanes to induce rotation, is increased by the aerodynamic establishment of a region of reduced pressure externally of the rotor mounted vanes. Toward that end, the convergent intake flow duct axially aligned with the rotor is formed by a tubular airfoil body having a trailing edge portion of tapering cross-section over which appears an expanded laminer airflow externally of the airfoil duct body to produce a low pressure region adjacent thereto in accordance with the Bernoulli theorem. The trailing edge portion of the airfoil duct therefore terminates in close adjacency to the rotor mounted vanes which bridge an axial gap between the exit end of the duct body and a flow deflecting wall to form the annular radial outflow opening from which the air discharges against the vanes. The surface of the flow deflecting wall transverse to the rotor axis, has a curvature extending forwardly or in an upstream direction along the rotor axis to reduce the turbulence created by the sharp directional change imparted to the axial airflow exiting from the duct.

The present invention as claimed therefore differs from the prior art as hereinbefore described, with respect to the positioning of airfoil-shaped rotor vanes within the low pressure region created by airflow over the external airfoil contour of a convergent, airfoil duct body through which an axial inflow of air is internally conducted to a curved flow deflecting surface directing the air in a radial outflow direction for impingement on the rotor vanes.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevation of a wind turbine generator assembly constructed in accordance with the present invention.

FIG. 2 is a rear end view of the assembly shown in FIG. 1.

FIG. 3 is an enlarged side sectional view taken substantially through a plane indicated by section line 3—3 in FIG. 2.

FIG. 4 is a transverse sectional view taken substantially through a plane indicated by section line 4—4 in FIG. 3.

FIG. 5 is an enlarged partial sectional view taken substantially through a plane indicated by section line 5—5 in FIG. 3.

FIG. 6 is an enlarged sectional view taken substantially through a plane indicated by section line 6—6 in FIG. 5.

DETAILED DESCRIPTION OF THE PREFERRED EMBODIMENT

Referring now to the drawings in detail, FIGS. 1 and 2 illustrate a wind driven turbine generator assembly, generally referred to by reference numeral 10, mounted for rotation about a vertical axis by means of a platform 12 on top of a tower structure 14. In the illustrated embodiment, the turbine assembly 10 is shown supported by frame members 16 and 18 on the rotatable platform so that it may be angularly orientated in the direction of the wind as depicted by arrows 20 in FIG. 1.

The turbine assembly includes a rotor generally denoted by reference numeral 22 having an elongated power shaft 24 supported for rotation about an axis adapted to be aligned parallel to the wind airflow direction indicated by arrows 20. The power shaft is journaled adjacent one end portion rearwardly of the rotor 22 by a bearing 26 carried by the frame members 16 and is connected to a pulley wheel 28. A compound pulley wheel assembly 30 rotatably mounted by the frame members 16 is drivingly connected by endless belt 32 to the pulley wheel 28 and transmits rotation at a high speed ratio through endless belt 34 to an electric generator 36. A power cable 38 extends from the generator to deliver energy to a desired location. The frame members 18 support an air intake duct generally referred to by reference numeral 40 forwardly of the rotor 22 to receive an axial inflow of air in the direction of the wind in order to induce rotation of the rotor and thereby drive the generator 36.

As shown in FIG. 3, the power shaft 24 may also be supported for rotation by a bearing 42 arranged through spokes 44 to position the duct 40 in coaxial relation to the power shaft and in axial alignment with the rotor 22 from which the power shaft extends. The rotor 22 is formed by a plurality of radial spokes 46 secured by fasteners 48 to a hub 50 secured to the power shaft. A plurality of turbine blades or vanes generally referred to by reference numeral 52 are secured to flange portions 54 of the spokes at their radially outer ends. The vanes 52 are cup shaped and have a radially outer airfoil contour 56 in a plane perpendicular to the rotor axis through the power shaft 24. As more clearly seen in FIG. 5, each vane 52 is positioned at a 15 degree angle to the tangent at the intersection of its supporting spoke with the circle defined by the leading edges 58 of the airfoil contours. Accordingly, a radial outflow of air impinging on the vanes will induce clockwise rotation of the rotor 22 as viewed in FIGS. 4 and 5. The airfoil contour 56 of the vanes will reduce air resistance to rotation in the direction of rotation.

With reference once again to FIG. 3, the rotor hub 50 is provided with a flow deflecting wall surface 60 having a convex curvature extending from a radially outer circular edge 62 forwardly to the rotor axis so as to reduce the turbulence created in deflecting the airflow as indicated by arrows 64 from an axial path within duct 40 to a radial outflow path impinging on the vanes 52. While the wall surface 60 is shown as part of the rotor hub 50 in the illustrated embodiment, it could be formed as a separate and non-rotatable wall member fixedly positioned transverse to the rotor axis in axially spaced relation rearwardly of the duct 40 to accomplish the same function. The deflecting wall surface cooperates with the duct 40 to form a radial outflow opening or axial gap at the rear exit end of the duct, bridged by the rotor vanes 52. To effectively entrap air impinging thereon, each vane 52 has side walls 63 and 65 extending radially inwardly from the outer airfoil contour portion 56 as more clearly seen in FIGS. 5 and 6. The side walls 65 extend at angle from the airfoil contour 56 as shown in FIG. 6, between 0° and 60° for optimum efficiency depending on the airflow velocity range.

The duct 40 is formed by a tubular airfoil body having an internal convergent wall surface 66 as shown in FIG. 3 extending from a leading air intake edge 68 to a trailing exit edge 70 axially spaced from the deflecting wall surface 60 to form the radial outflow gap bridged by the vanes 52 as aforementioned. The external airfoil surface 72 of duct body is aerodynamically designed to create a low pressure region 74 adjacent the trailing edge 70 embracing the vanes 52 by virtue of maintaining the laminar flow expansion phenomenon that occurs with respect to airfoil surfaces. As a result, the pressure differential across the vanes in the direction of the radial outflow of air is increased to further increase the velocity of the air impinging on the vanes.

It will be apparent that air entering the duct 40 at the leading edge 68 will be accelerated by its volumetric contraction as it is conducted through the convergent axial flow passage formed by the internal wall surface 66. This ordinarily reduces the static pressure of the air and the pressure differential across the vanes so that kinetic energy of the air is transferred to the rotor through the vanes. The aerodynamic creation of the external low pressure region 74 and the bridging relationship of the vanes 52 to the radial outflow gap within the low pressure region produces a pressure differential to further increase the amount of energy in the air converted into kinetic energy of the rotor for more efficient conversion of wind power into useful forms.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a wind turbine assembly from which power is taken having a rotor adapted to be mounted for rotation about an axis substantially parallel to the direction of airflow, a plurality of vanes carried on said rotor in radially spaced relation to said axis, flow controlling duct means mounted in operative relation to the rotor for conducting a radial outflow of air against said vanes to induce rotation of the rotor, and airfoil surface means mounted externally on the duct means for producing a low pressure region within which said vanes are positioned by the rotor to enhance rotation thereof in response to inflow of the air through the duct means.

2. The combination of claim 1 wherein said duct means includes an axial flow portion having an inlet end through which said inflow of air enters, and flow deflecting surface means spaced from the axial flow portion along the rotor axis for directionally changing the inflow of air into said radial outflow.

3. The combination of claim 2 wherein said airfoil surface means comprises an annular airfoil body enclosing said axial flow portion of the duct means and having a trailing edge adjacent to said vanes, the low pressure region being formed at said trailing edge so as to embrace the vanes.

4. The combination of claim 3 wherein said axial flow portion includes an internal tubular wall surface defining a converging axial flow passage along said rotor axis.

5. The combination of claim 4 wherein each of said vanes has an airfoil cup shape extending in an axial direction substantially between the trailing edge of the airfoil means and the flow deflecting surface means.

6. The combination of claim 5 wherein said flow deflecting surface means includes an end wall extending transversely of said axial flow passage.

7. The combination of claim 1 wherein said airfoil surface means comprises an annular airfoil body enclosing said axial flow portion of the duct means and having leading and trailing edges, the low pressure region being formed at said trailing edge so as to embrace the vanes.

8. The combination of claim 7 wherein each of said vanes has an airfoil cup shape.

9. The combination of claim 3 wherein each of said vanes has an airfoil cup shape extending in an axial direction substantially between the trailing edge of the airfoil means and the flow deflecting surface means.

10. The combination of claim 7 wherein said axial flow portion includes an internal tubular wall surface defining a converging axial flow passage along said rotor axis.

11. The combination of claim 2 wherein said flow deflecting surface means includes an end wall extending transversely of said axial flow passage.

12. The combination of claim 2 wherein said flow deflecting means includes a wall surface transverse to the axial flow portion having a convex curvature.

13. In a turbine assembly from which power is taken having a rotor adapted to be mounted for rotation about an axis substantially parallel to the direction of flow, a plurality of vanes carried on said rotor in radially spaced relation to said axis, an intake flow duct mounted in axially aligned relation to the rotor and having a radial outlet in axial alignment with said vanes, and an annular airfoil body carried by said flow duct having a leading edge portion and a trailing edge portion terminating at said radial outlet of the duct radially inwardly of and adjacent to the vanes.

14. The combination of claim 13 wherein said vanes are provided with airfoil curvatures in a plane perpendicular to the rotor axis.

* * * * *